Feb. 9, 1960 A. J. HUCK 2,924,349
MIXER BOWL
Filed March 5, 1956 2 Sheets-Sheet 1

INVENTOR:
Alfred J. Huck,
BY
Bair, Freeman & Molinare
ATTORNEYS.

Feb. 9, 1960   A. J. HUCK   2,924,349
MIXER BOWL
Filed March 5, 1956   2 Sheets-Sheet 2
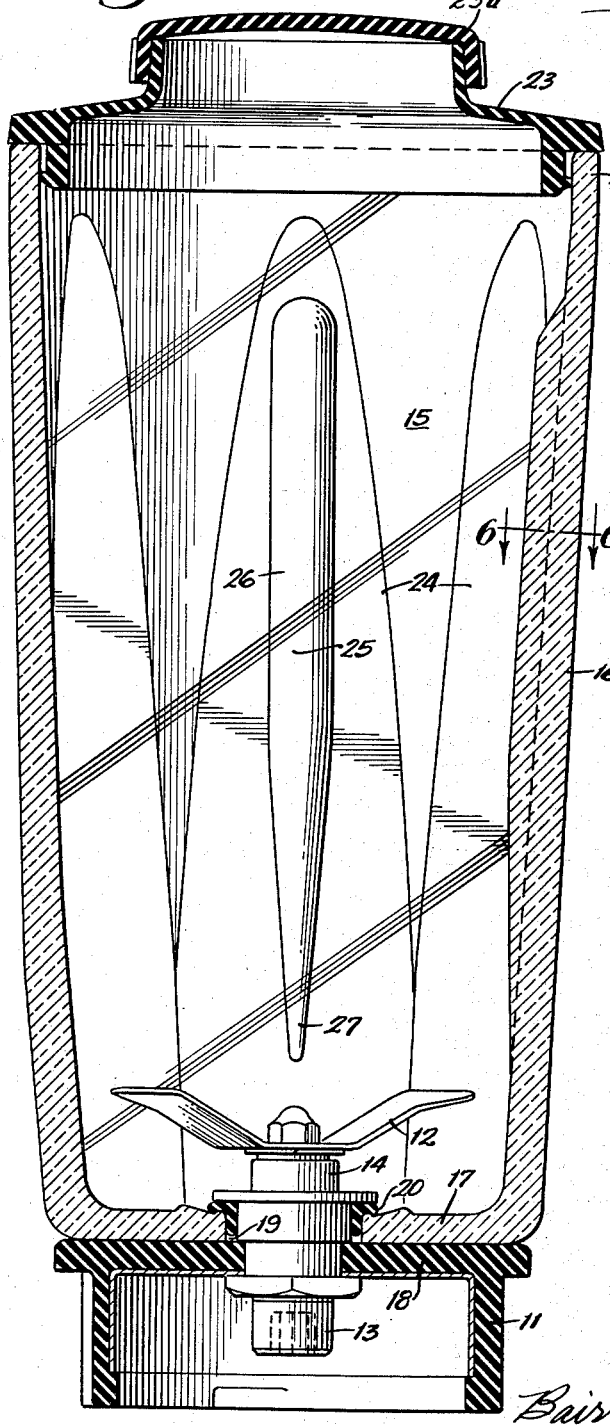
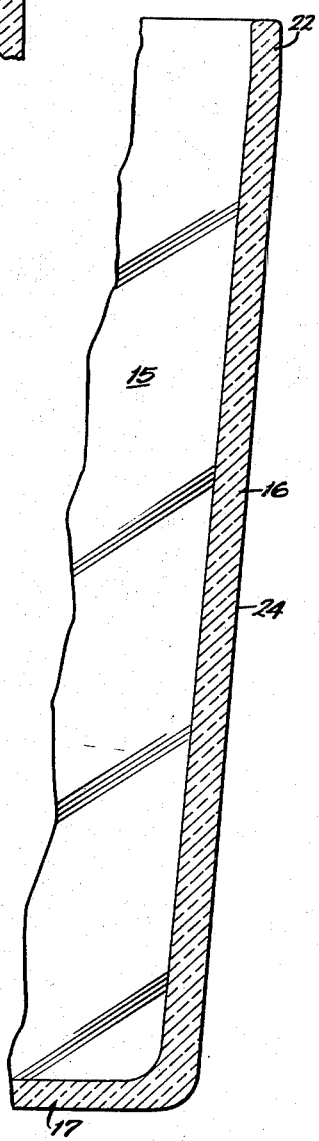
INVENTOR:
Alfred J. Huck,
BY Bair, Freeman & Molinare
ATTORNEYS.

United States Patent Office 2,924,349
Patented Feb. 9, 1960

2,924,349

MIXER BOWL

Alfred J. Huck, St. Louis, Mo., assignor to Knapp-Monarch Company, St. Louis, Mo., a corporation of Delaware Application March 5, 1956, Serial No. 569,428

6 Claims. (Cl. 215—1)

This invention relates to a mixer bowl and particularly to a mixer bowl in which cutting blades are located at the bottom of the bowl and are rotated at high speed to prepare foods and beverages.

It is an advantage in bowls of this type to provide an internal shape at the bottom of the bowl which is other than cylindrical so that the materials operated upon by the blades are violently agitated and are thrown back into the path of the blades. It is also advantageous, however, to have the top of the bowl substantially cylindrical and circular in shape so that a circular closure member may be utilized and so that the closure member will not be forced off during operation of the mixer.

It is also advantageous to provide for agitation adjacent the top of such a bowl so that the material being worked upon by the blades will be recirculated from the top back to the blades.

Another problem is to provide sufficient volume and also to design a bowl formed of glass or some similar material which may be practically formed by the glass molder.

It is, therefore, an object of the invention to provide a mixer bowl which will accomplish all the above desired results.

It is another object of the invention to provide a mixing bowl formed of glass or the like which has other than a round shape in the bottom area of the bowl where the cutting blades provide the mixing action, with a round section at the top of the bowl to permit use of a rubber plug type sealing lid and with an internal rib design in that area between the hexagonal lower shape and the upper round shape to provide proper feed-back when large volumes of material are mixed.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 5 is a sectional view taken on line 5—5 of Figure 2 with the upper portion of the base which supports the bowl shown in section;

Figure 6 is a partial sectional view of the bowl taken on line 6—6 of Figure 5; and Figure 7 is a partial sectional view of the bowl taken on line 7—7 of Figure 2.

Figure 1:
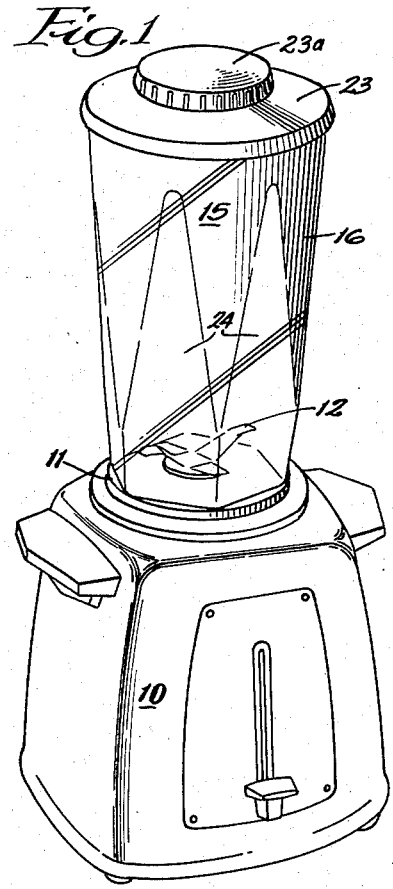
Figure 1 is a perspective view of a mixing device made in accordance with my invention.
Figure 2:
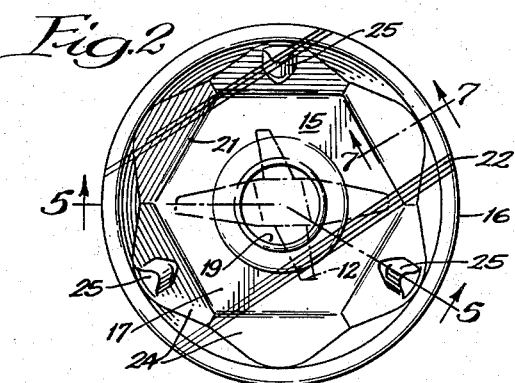
Figure 2 is a top plan view of the bowl shown in Figure 1.
Figure 3:
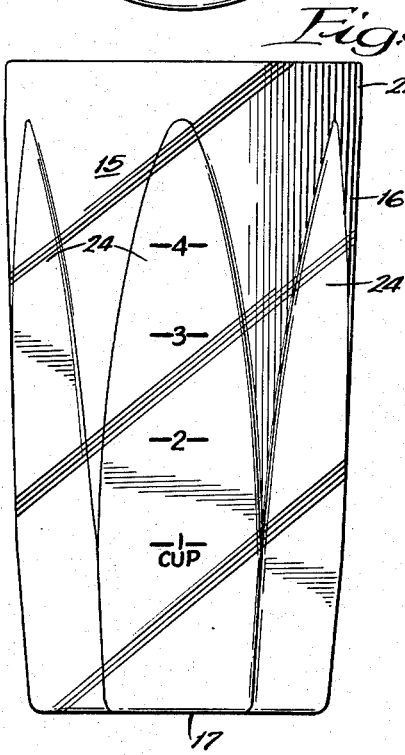
Figure 3 is a side elevational view of the bowl shown in Figure 1.
Figure 4:
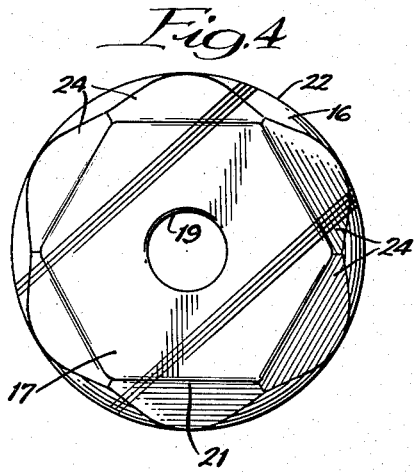
Figure 4 is a bottom view of the bowl shown in Figure 1.

Referring specifically to the drawings for a detailed description of the invention, numeral 11 designates generally the base portion of a mixer which contains suitable mechanism not shown to drive cutting blades 12 which are disposed within a bowl generally indicated at 15. The cutting blades 12 are rotated by means of a shaft 14 which is connected to a coupling 13 which in turn is driven by a motor (not shown).

The bowl 15 is provided with side walls 16 and a bottom wall 17, the latter of which seats on a horizontal platform 18 formed by the top of the base 11. A suitable rubber sealing gasket 20 is inserted in an opening 19 in the bottom of the bowl.

The bottom of the bowl is hexagonal in shape as shown at 21 and the hexagonal shape merges into a cylindrical shape at the top of the bowl as shown at 22 so that an annular plug type closure, preferably formed of resilient material and shown at 23, and carrying a plastic cap-type central closure member 23a, may be secured to the top of the bowl. The hexagonal shape at the bottom of the bowl merges into a round shape at the top of the bowl by the expedient of upwardly tapering flutes 24 which, of course, are six in number. On the inside of every other flute there is a vertical rib 25 which extends from adjacent the top of the bowl to a point just slightly above the blades 12 so that the material at the upper portion of the bowl when the blades are rotated is fed back to the blades. The ribs 25 are of general V-shaped formation throughout their entire height. The V cross-section is larger near the top of the rib and smaller near the bottom of the rib. The upper portion 26 of rib 25 is substantially of uniform V cross-section, and the lower portion 27 of rib 25 tapers from the size of rib portion 26 until it disappears at a point adjacent to and slightly above the uppermost reach of the mixing blades 12.

In operation, when the blades 12 are being rotated, the hexagonal bottom portion provides for good mixing action and if the bowl 15 contains sufficient material the ribs 25 tend to return the material adjacent the upper portion of the bowl to the blades 12. Furthermore, since the upper portion of the bowl is cylindrical, a cylindrical or circular closure may be utilized.

As a further advantage it is to be noted that a bowl 15 of circular cross-section will have a greater capacity than a polygonal bowl of the same height and same maximum diametral width. Accordingly, the bowl 15 of this invention has an increased capacity over hexagonal bowls or square bowls that have heretofore been used, while still retaining the desirable features of previous bowls where the sides and inner corners of the polygonal bowls cooperated with the mixing blades to obtain the mixing action.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A mixer bowl for use with a mixer having a mixing rotor which is adapted to be contained in the lower portion of the mixer bowl; said mixer bowl being an upright hollow body having an interior shape and arrangement wherein the lower portion of the interior of the bowl is polygonal in shape, the upper portion of the interior of the bowl being circular in shape, and there being an elongated middle section of the bowl located between said lower portion of polygnal shape and said upper portion of circular shape, said middle section extending over a major portion of the height of said bowl, said middle section of the bowl being fluted over a major portion of the height of the bowl to provide a gradual blending between the polygonal shape at the lower portion and the circular shape at the upper portion.

2. A mixer bowl for use with a mixer having a mixing rotor which is adapted to be contained in the lower portion of the mixer bowl; said mixer bowl being an upright hollow body having an interior shape and arrangement wherein the lower portion of the interior of the bowl is polygonal in shape, the upper portion of the interior of the bowl being circular in shape, and there being an elongated middle section of the bowl located between said lower portion of polygonal shape and said upper portion of circular shape, said middle section of the bowl being fluted to provide a gradual blending between the polygonal shape at the lower portion and the circular shape at the upper portion, and at least one upright rib on the interior of the bowl in said middle section of the bowl.

3. A mixer bowl for use with a mixer having a mixing rotor which is adapted to be contained in the lower portion of the mixer bowl; said mixer bowl being an upright hollow body having an interior shape and arrangement wherein the lower portion of the interior of the bowl is polygonal in shape, the upper portion of the interior of the bowl being circular in shape, there being an elongated middle section of the bowl located between said lower portion of polygonal shape and said upper portion of circular shape, said middle section of the bowl being fluted to provide a gradual blending between the polygonal shape at the lower portion and the circular shape at the upper portion, and at least one upright rib on the interior of the bowl in said middle section of the bowl, said rib being tapered toward the bottom thereof.

4. A mixer bowl for use with a mixer having a mixing rotor which is adapted to be contained in the lower portion of the mixer bowl; said mixer bowl being an upright hollow body having an interior shape and arrangement wherein the lower portion of the interior of the bowl is polygonal in shape, the upper portion of the interior of the bowl being circular in shape, there being an elongated middle section of the bowl located between said lower portion of polygonal shape and said upper portion of circular shape, said middle section of the bowl being fluted to provide a gradual blending between the polygonal shape at the lower portion and the circular shape at the upper portion, and a plurality of upright ribs on the interior of the bowl in said middle section of the bowl.

5. A mixer bowl for use with a mixer having a mixing rotor which is adapted to be contained in the lower portion of the mixer bowl; said mixer bowl being an upright hollow body having an interior shape and arrangement wherein the lower portion of the interior of the bowl is polygonal in shape, the upper portion of the interior of the bowl being circular in shape, there being an elongated middle section of the bowl located between said lower portion of polygonal shape and said upper portion of circular shape, said middle section of the bowl being fluted to provide a gradual blending between the polygonal shape at the lower portion and the circular shape at the upper portion and a plurality of upright ribs on the interior of the bowl in said middle section of the bowl being symmetrically disposed and each rib being located substantially centrally of one of the sides defined by said lower portion of polygonal shape.

6. A mixer bowl for use with a mixer having a mixing rotor which is adapted to be contained in the lower portion of the mixer bowl; said mixer bowl being an upright hollow body having an interior shape and arrangement wherein the lower portion of the interior of the bowl is hexagonal in shape, the upper portion of the interior of the bowl being circular in shape, there being an elongated middle section of the bowl located between said lower portion of hexagonal shape and said upper portion of circular shape, said middle section of the bowl being fluted to provide a gradual blending between the hexagonal shape at the lower portion and the circular shape at the upper portion, and three upright ribs on the interior of the bowl in said middle section of the bowl located substantially centrally of alternate ones of the six sides defined by said lower portion of hexagonal shape.

References Cited in the file of this patent

UNITED STATES PATENTS

| | | |
|---|---|---|
| 140,059 | McHarg et al. | June 17, 1873 |
| 1,994,525 | Madda | Mar. 19, 1935 |
| 2,160,328 | Durham | May 30, 1939 |
| 2,226,372 | Cravatis | Dec. 24, 1940 |
| 2,309,347 | Landgraf | Jan. 26, 1943 |
| 2,585,255 | Kochner et al. | Feb. 12, 1952 |
| 2,733,052 | Luther | Jan. 3, 1956 |